(12) United States Patent
Miya et al.

(10) Patent No.: US 6,517,339 B1
(45) Date of Patent: Feb. 11, 2003

(54) RESIN MOLDING MOLD

(75) Inventors: Yukio Miya, Saitama (JP); Osamu Sugiyama, Saitama (JP); Hidefumi Kasai, Tokyo (JP)

(73) Assignee: Citizen Watch, Co., Ltd., Nishitokyo (JP)

( * ) Notice: Subject to any disclaimer, the term of this patent is extended or adjusted under 35 U.S.C. 154(b) by 0 days.

(21) Appl. No.: 09/674,830

(22) PCT Filed: Mar. 6, 2000

(86) PCT No.: PCT/JP00/01342

§ 371 (c)(1),
(2), (4) Date: Nov. 7, 2000

(87) PCT Pub. No.: WO00/53386

PCT Pub. Date: Sep. 14, 2000

(30) Foreign Application Priority Data

Mar. 8, 1999 (JP) ............................................. 11-60659

(51) Int. Cl.⁷ .............................................. B29C 45/00
(52) U.S. Cl. ....................................... 425/542; 425/810
(58) Field of Search ................................. 425/542, 810

(56) References Cited

U.S. PATENT DOCUMENTS

| 5,112,025 A | 5/1992 | Nakayama et al. | ......... 249/112 |
|---|---|---|---|
| 5,827,613 A | 10/1998 | Nakayama et al. | ......... 428/408 |
| 5,934,321 A | 8/1999 | Miya et al. | |

FOREIGN PATENT DOCUMENTS

| EP | 0872331 A1 | 10/1998 |
|---|---|---|
| JP | 61-258713 | 11/1986 |
| JP | 62-267937 | 11/1987 |
| JP | 01062468 | 8/1989 |
| JP | 1-234214 | 9/1989 |
| JP | 05169459 | 9/1993 |
| JP | 07195377 | 1/1995 |
| JP | 7-195377 | 8/1995 |
| WO | WO99/37471 | 7/1999 |

*Primary Examiner*—Tim Heitbrink
(74) *Attorney, Agent, or Firm*—Armstrong, Westerman & Hattori, LLP

(57) ABSTRACT

A cavity (5) for a mold for molding a resin is formed by a fixed mold (1) and a moving mold (2), and a diamond-like carbon film (30) is formed on at least at a part to be contacted with a stamper (6) on a surface (2a) of the mold (2) to which the stamper (6) is attached with an intermediate layer (20) made of silicon, tungsten, titanium carbide, silicon carbide, chromium carbide, or the like which improves adhesion to the surface (2a) of the mold (2) interposed in-between to drastically increase useful life of the mold for molding a resin and also increase useful life of the stamper without causing damage thereto.

5 Claims, 8 Drawing Sheets

RESIN MOLDING MOLD

TECHNICAL FIELD

This invention relates to a mold for molding a resin which is composed of a fixed mold and a moving mold and used with a stamper being attached to a surface of one of the molds forming a cavity when both molds are closed, a mold for molding, for example, a compact disc, an optical disc, a magnetic optical disc, a laser disc, or the like, and a method of forming a hard film at a part to be contacted with a stamper on the surface forming the cavity for the mold for molding a resin.

BACKGROUND TECHNOLOGY

In the case of fabrication of a disc-shaped record medium such as a compact disc, an optical disc, a magnetic optical disc, a laser disc, or the like in which music, image, and the like are recorded, a stamper (a mother die) is attached to a surface of one (generally a moving mold) of molds of a resin molding mold composed of a fixed mold and the moving mold forming a cavity when both molds are closed, and a resin is injected with pressure into the cavity, thereby molding the resin and simultaneously transferring projections and depressions on the surface of the stamper.

The fixed mold and the moving mold of the resin molding mold described above are formed made of steel for a resin molding mold and their stamper mounting face and cavity forming faces are subjected to hardening and annealing to improve resistance-to-wear as shown in Japanese Patent Laid-open Publication No. 62-267937 (JP, 62-267937, A).

The stamper mounting face and the cavity forming faces are finished in a mirror face state, thereby increasing accuracy in dimension of an injection-molded disc. The stamper is made of nickel, and the face which is contacted with the stamper mounting face of the mold is finished in a mirror face state.

At the time of injection molding by the above-described resin molding mold, a molten resin at a high temperature is injected into the cavity and thus a high pressure applied thereto, whereby the stamper repeats expansion and shrinkage due to the high temperature and high pressure in each shot to rub against the surface of the mold forming the cavity, thereby wearing the surface. Once the stamper mounting face of the mold is worn out, the stamper is susceptible to flaw and fracture.

Though the stamper is replaced with another in accordance with a disc to be molded, the mold is commonly used and costly, and thus it is desired to be used for a long term.

To this end, it is proposed that a hard layer composed of a material which is higher in hardness and better in resistance-to-wear than the material of a mold forming a stamper mounting face, for example, a thin film made of titanium carbide (TiC), silicon carbide (SiC), titanium nitride (TiN), or the like is formed on the stamper mounting face in an optical disc fabricating mold, for example, in the aforesaid Japanese Patent Laid-open Publication No. 62-267937.

Further, in Japanese Patent Laid-open Publication No. 1-234214 (JP, 1-234214, A), it is proposed that a part supporting a stamper of the surface forming a cavity for the disc molding mold as described above is coated with a diamond-like thin film, thereby substantially improving the resistance-to-wear and the low friction property to substantially increase useful life of the stamper and mold.

The formation, as the former, of a hard layer composed of a material which is higher in hardness and better in resistance-to-wear than the material of the stamper mounting face on the stamper mounting face of the mold surface forming the cavity of the resin molding mold is effective in enhancing the resistance-to-wear of the stamper mounting face of the molding mold and increasing useful life of the mold, but it is not sufficient only to form titanium carbide (TiC), silicon carbide (SiC), titanium nitride (TiN), or the like as the hard film.

Moreover, it is expected that by applying a diamond-like thin film (a diamond-like carbon film: abbreviated as a DLC film), as the latter, the resistance-to-wear of the stamper mounting face of the molding mold is drastically enhanced and the friction resistance with the stamper is remarkably decreased to substantially increase useful life of the stamper and mold.

However, it was found that the adhesion of the DLC film to the mold surface is weak if the DLC film is formed directly on the surface forming the cavity of the mold made of steel for the resin molding mold, bringing about problems that the DLC film peels off upon performance of polishing and lapping in order to finish the surface of the formed DLC film in a mirror face, and that the DLC film peels off by internal stress or the like during use.

The present invention is made to solve the above problems and its object is to form a DLC film which is a hard film on a surface forming a cavity of a resin molding mold at least at a part to be contacted with a stamper with strong adhesion not to easily peel off, thereby drastically increasing useful life of the resin molding mold and also increasing useful life of the stamper without causing damage thereto.

DISCLOSURE OF THE INVENTION

To attain the above object, this invention provides a mold for molding a resin structured as follows and a method of forming a hard film on the mold for molding a resin.

That is, a mold for molding a resin according to this invention is composed of a fixed mold and a moving mold and used with a stamper being attached to a surface of the mold forming a cavity when both molds are closed, wherein a diamond-like carbon film which is a hard film is formed on the surface of the mold at least at a part to be contacted with the stamper with an intermediate layer for enhancing adhesion strength to the surface of the mold interposed in-between.

The intermediate layer may have a single-layer structure made of any one of silicon, tungsten, titanium carbide, silicon carbide, and chromium carbide.

Further, it is more suitable that the intermediate layer has a double-layer structure composed of a lower layer made primarily of chromium or titanium and an upper layer made primarily of silicon or germanium.

Alternatively, the intermediate layer may have a double-layer structure composed of a lower layer made primarily of titanium and an upper layer made primarily of any one of tungsten, tungsten carbide, silicon carbide, and titanium carbide.

Furthermore, it is also suitable that the intermediate layer has a triple-layer structure composed of a lower layer made primarily of titanium, a middle layer made primarily of titanium carbide or silicon carbide, and an upper layer made primarily of carbon.

It is preferable that the diamond-like carbon film formed on the surface of the mold at the part to be contacted with the stamper with the intermediate layer interposed in-between has a surface roughness of 0.2 μM to 0.02 μm.

A method of forming a hard film on a mold for molding a resin according to this invention is a method of forming a hard film on a mold for molding resin composed of a fixed mold and a moving mold and used with a stamper being attached to a surface of the mold forming a cavity when both molds are closed, and characterized by comprising:

a step of disposing the mold with the surface thereof to which the stamper is attached having been cleaned in a vacuum chamber and evacuating it;

an intermediate layer forming step of feeding argon into the evacuated vacuum chamber and ionizing it to form an intermediate layer on the surface of the mold at least at a part to be contacted with the stamper by sputtering process with any one of silicon, tungsten, titanium carbide, silicon carbide, and chromium carbide as a target;

a step of exhausting the argon in the vacuum chamber and feeding a carbon-containing gas into the vacuum chamber; and a step of generating plasma in the vacuum chamber to form a diamond-like carbon film on the surface of the intermediate layer by plasma CVD process.

It is more preferable to form a double-layered intermediate layer by carrying out, in place of the above intermediate layer forming step, the first intermediate layer forming step of feeding argon into the evacuated vacuum chamber and ionizing it to form a lower layer of an intermediate layer made primarily of chromium or titanium on the surface of the mold at least at a part to be contacted with the stamper by sputtering process with chromium or titanium as a target; and following the above step, the second intermediate layer forming step of forming an upper layer of the intermediate layer made primarily of silicon or germanium on the lower layer by sputtering process with silicon or germanium as a target.

Alternatively, it is also suitable to form a double-layered intermediate layer by carrying out, in place of the above intermediate layer forming step, the first intermediate layer forming step of feeding argon into the evacuated vacuum chamber and ionizing it to form a lower layer of an intermediate layer made primarily of titanium on the surface of the mold at least at a part to be contacted with the stamper by sputtering process with titanium as a target; and following the above step, the second intermediate layer forming step of forming an upper layer of the intermediate layer made primarily of tungsten on the lower layer by sputtering process with tungsten as a target.

Moreover, it is also suitable to form a double-layered intermediate layer by carrying out the first intermediate layer forming step of feeding argon into the evacuated vacuum chamber and ionizing it to form a lower layer of an intermediate layer made primarily of titanium on the surface of the mold at least at a part to be contacted with the stamper by sputtering process with titanium as a target; and following the above step, the second intermediate layer forming step of feeding a carbon-containing gas into the vacuum chamber to form an upper layer of the intermediate layer made primarily of tungsten carbide or silicon carbide on the lower layer by reactive sputtering process with tungsten or silicon as a target.

Furthermore, it is also suitable to form a triple-layered intermediate layer by carrying out the first intermediate layer forming step of feeding argon into the evacuated vacuum chamber and ionizing it to form a lower layer of an intermediate layer made primarily of titanium on the surface of the mold at least at a part to be contacted with the stamper by sputtering process with titanium as a target;

following the above step, the second intermediate layer forming step of feeding a carbon-containing gas into the vacuum chamber to form a middle layer of the intermediate layer made primarily of titanium carbide or silicon carbide on the lower layer by reactive sputtering process with titanium or silicon as a target; and following the above step, the third intermediate layer forming step of forming an upper layer made primarily of carbon on the middle layer by gradually reducing a sputtering amount of titanium or silicon as the target.

In the method of forming a hard film on a mold for molding a resin, it is desirable to carry out, after the step of forming the diamond-like carbon film, the step of finish grinding the surface of the diamond-like carbon film formed in the step by polishing and lapping.

It is suitable that the polishing and lapping in the step of finish grinding are performed using a diamond paste and an alumina paste with particle diameters of diamond and alumina ranging from 0.1 μm to 4 μm.

BEST MODE FOR CARRYING OUT THE INVENTION

Hereinafter, a preferred embodiment of this invention will be described with reference to the accompanying drawings.

Embodiment of Resin Molding Mold

Figure 1:
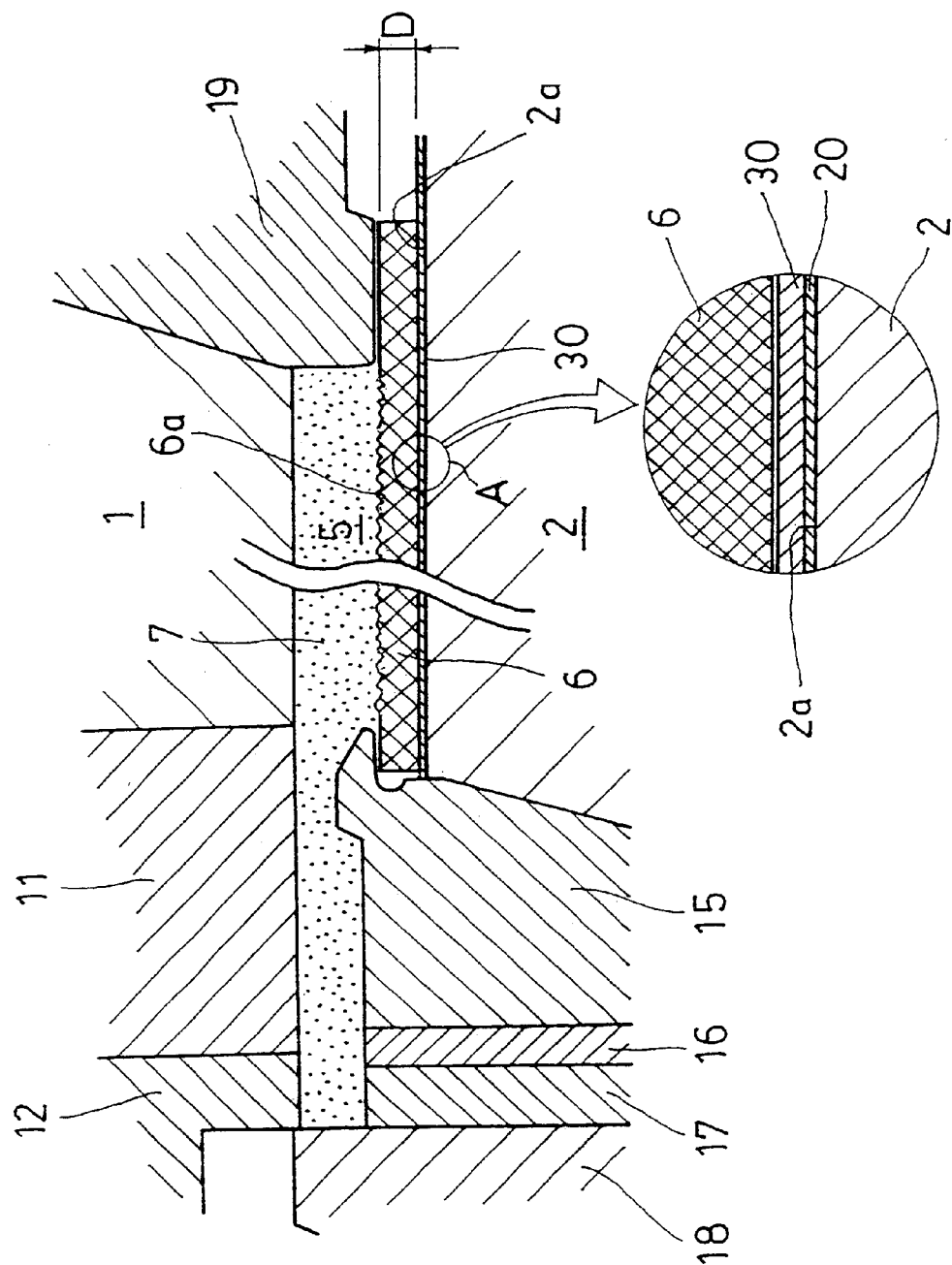
FIG. 1 is a partly enlarged sectional view of a part where a stamper is attached in FIG. 2.
Figure 2:
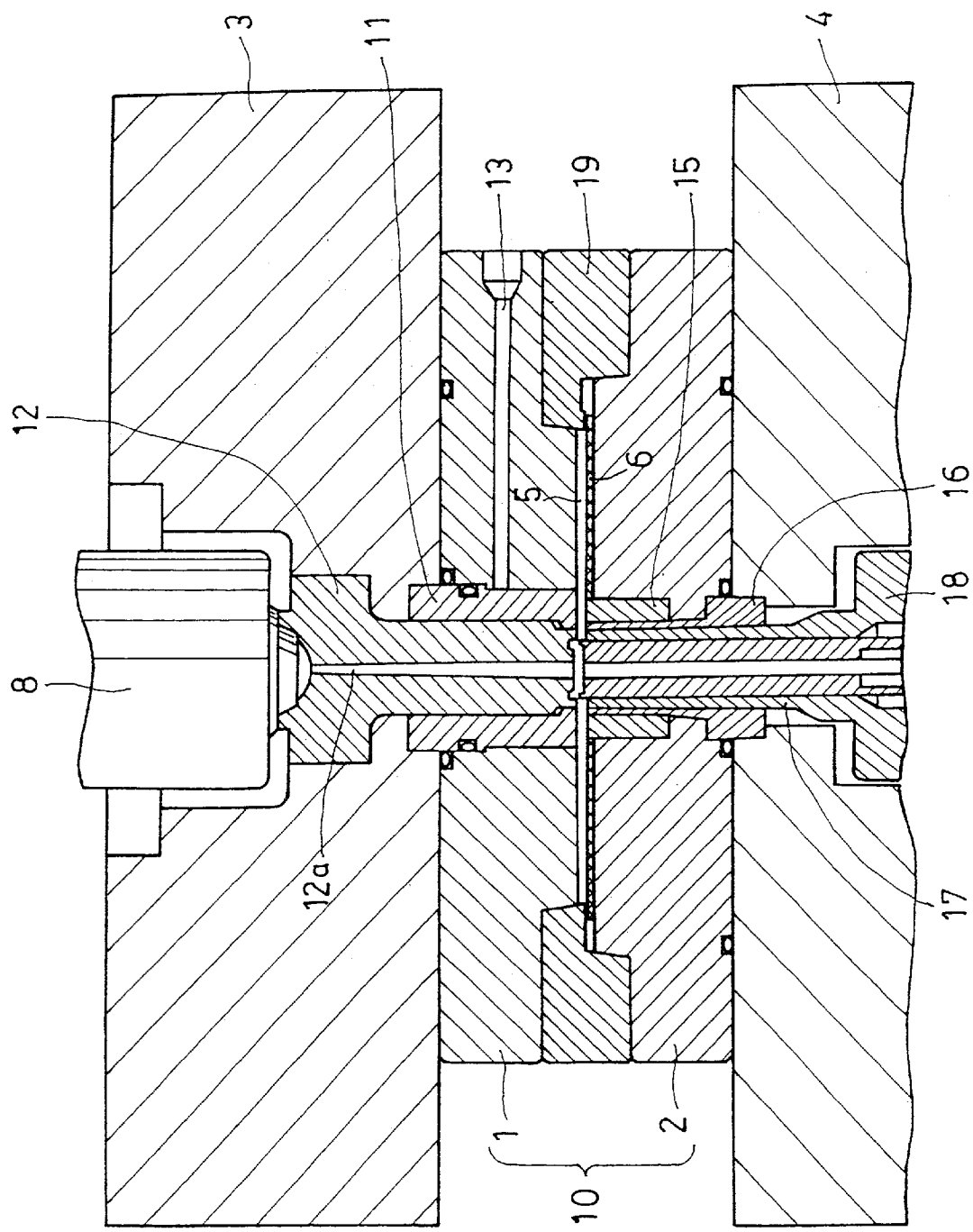
FIG. 2 is a sectional view showing a principal portion of an injection molding apparatus employing a resin molding mold according to this invention.

FIG. 2 is a sectional view showing a principal portion of an injection molding apparatus for molding various kinds of discs such as a compact disc, a video disc, and the like for which this invention is carried out, and FIG. 1 is a partly enlarged view of a stamper mounting portion thereof.

This injection molding apparatus forms a cavity 5 forming a shape of a molding (a disc) as shown in FIG. 2, with a fixed mold 1 being fixed to a fixed side die plate 3 and a moving mold 2 being fixed to a moving side die plate 4, and the moving mold 2 closely contacting the fixed mold 1 by a mold closing cylinder not shown. The fixed mold 1 and the moving mold 2 are made of steel and form a resin molding mold 10 that is a target of this invention.

At the central portion of the fixed mold 1 a fixed side bush 11 is fixed, into which a spool bush 12 attached to the fixed side die plate 3 is inserted. A gate 12a for leading a resin injected from an injection nozzle 8 to the cavity is provided at the center of the spool bush 12. An air vent 13 is formed in the fixed mold 1.

On the other hand, at the central portion of the moving mold 2 an inner stamper retainer 15 and a moving side bush 16 are secured, and tip portions of a spool cut punch 17 and an ejector 18 provided through the moving side die plate 4 are inserted into the moving side bush 16.

A disc-shaped stamper (a mother die) 6 is attached to adhere to a surface 2a of the moving mold 2 forming the cavity 5. More specifically, the stamper 6 with a thickness of D is attached such that the central portion thereof is pressed by the inner stamper retainer 15 and the outer peripheral portion thereof is pressed to the surface (the mold surface) 2a of the moving mold 2 by an outer peripheral ring 19 as shown in FIG. 1. The outer peripheral ring 19 also forms a peripheral wall of the cavity 5.

This stamper 6 is made of nickel, the surface (the face on the cavity side) thereof is provided with many projections and depressions 6a for forming grooves or pits which become recorded information on a disc to be molded, and the rear face (the face on the side contacting the surface of the moving mold) is finished in a mirror-face state.

The surface 2a of the moving mold 2 contacting the stamper 6, is also finished in a mirror face, and a diamond-like carbon (DLC) film 30 that is a hard film is formed on the mold surface 2a with an intermediate layer 20 interposed in-between as shown by a part enclosed with a circle A enlarged in FIG. 1.

The DLC film 30 is an amorphous carbon film having diamond-like structure and properties, called a diamond-like thin film, a hard carbon film, a hydrogenated amorphous carbon film, an i-carbon film, or the like. It has high resistance-to-wear because of a high Vickers hardness of 2000 kg/mm$^2$ or higher, a low friction coefficient, a good lubrication characteristic, and high corrosion resistance.

The intermediate layer 20 is a thin film layer composed of one or more layers provided to enhance adhesion of the DLC film 30 to the mold surface 2a. In the case of the single-layer structure, it is made of any one of silicon, (Si), tungsten (W), titanium carbide (TiC), silicon carbide (SiC), and chromium carbide (CrC).

The DLC film 30 is formed on the mold surface 2a with the intermediate layer 20 interposed in-between, whereby the DLC film 30 is firmly formed on the mold surface 2a with good adhesion, so that the surface never peels off caused by performance of polishing and lapping to smooth further the surface or due to inertial stress or the like due to heat and pressure in use.

Upon molding a disc by the injection molding apparatus, the moving mold 2 is joined to the fixed mold 1 and they are closed to form the cavity 5 as shown in FIG. 2. Then, the injection nozzle 8 shown in FIG. 2 is closely attached to the outermost portion of the spool bush 12, a molten resin 7 is injected into the gate 12a to be filled with pressure into the cavity 5, thereby molding the disc.

At this time, the stamper 6 expands to some degrees by a high temperature (approximately 360° C.) of the molten resin 7 and slides on the mold surface 2a while receiving a high resin pressure (approximately 400 kg/cm$^2$). However, the provision of the DLC film 30 prevents the mold surface 2a and the contacting face of the stamper 6 itself from wearing by virtue of its high resistance-to-wear and good lubrication characteristic. As a result of an experiment, the mold surface 2a was not damaged even after two hundred thousand shots were conducted.

Structure of Intermediate Layer

Next, various examples of the structure of the intermediate layer 20 will be explained with reference to FIG. 3 to FIG. 6. These drawings are schematic sectional views each showing the structure of the DLC film 30 and the intermediate layer 20 by substantially enlarging a very small part in the vicinity of the surface 2a of the moving mold (hereinafter, referred only to as "mold") 2.

Figure 3:
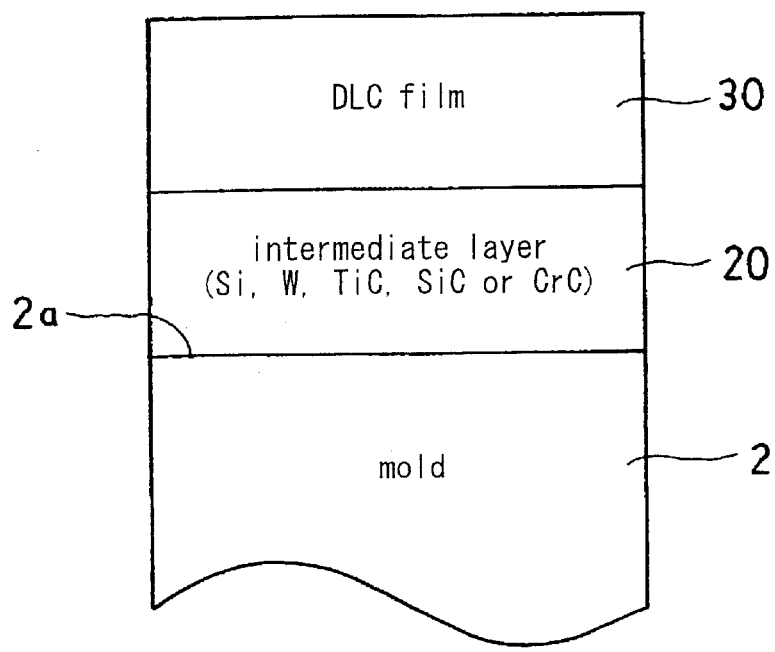
FIG. 3 is a schematic view showing an example of a structure of a DLC film and an intermediate layer by substantially enlarging a very small part in the vicinity of the surface of the mold in FIG. 1.

In FIG. 3, the DLC film 30 that is a hard film is formed on the mold surface 2a with an intermediate layer 20 of a single-layer structure interposed in-between. The intermediate layer is made of any one of silicon (Si), tungsten (W), titanium carbide (TiC), silicon carbide (SiC), and chromium carbide (CrC) to a thickness of about 1 μm. The DLC film 30 is formed to a thickness of about 1 μm to 5 μm.

Figure 4:
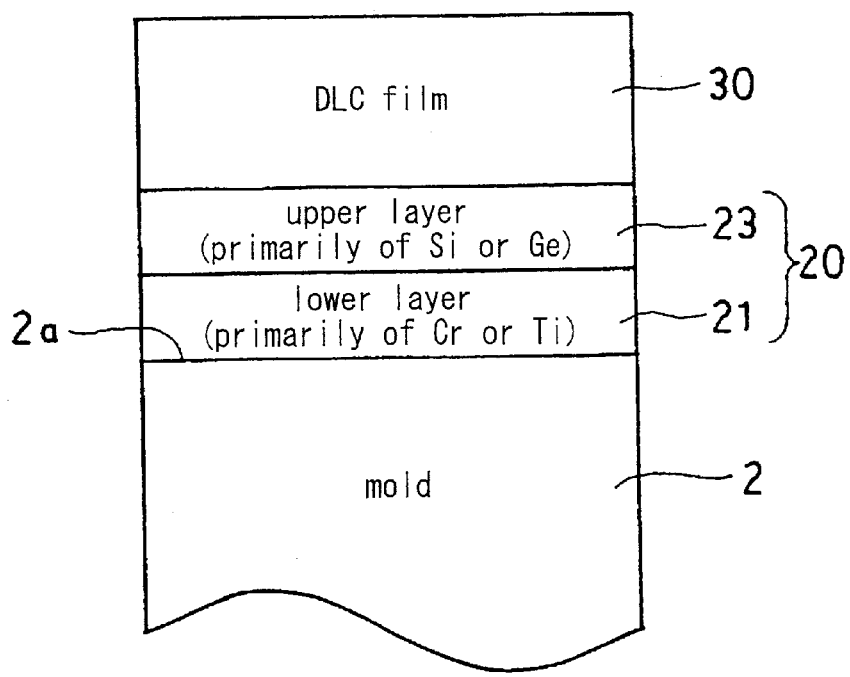
FIG. 4 is a schematic sectional view showing an example of a structure of a double-layered intermediate film, similarly.

FIG. 4 shows an example in which an intermediate layer of a double-layer structure is formed, an intermediate layer 20 composed of a lower layer 21 and an upper layer 23 is formed on the mold surface 2a, and a DLC film 30 is formed on the upper layer 23. The lower layer 21 is formed primarily of chromium (Cr) or titanium (Ti) to a thickness of about 0.5 μm, and the upper layer 23 is formed primarily of silicon or germanium to a thickness of about 0.5 μm.

In this case, chromium or titanium of the lower layer 21 of the intermediate layer 20 can be formed with good adhesion to the steel composing the mold 2. Further, silicon or germanium of the upper layer 23 is an element belongs in the same WVb group on the periodic table of elements as carbon composing the DLC film 30, and either of them has a diamond structure. Therefore, the upper layer 23 and the DLC film are bonded together with high adhesion strength due to covalent bonding. In addition, chromium or titanium composing the lower layer and silicon or germanium composing the upper layer can be film-formed with good adhesion strength to each other.

Accordingly, the DLC film 30 is formed on the mold surface 2a with the intermediate later 20 structured as above interposed in-between, thereby forming the DLC film 30 with stronger adhesion strength and drastically enhancing durability of the mold 2.

Figure 5:
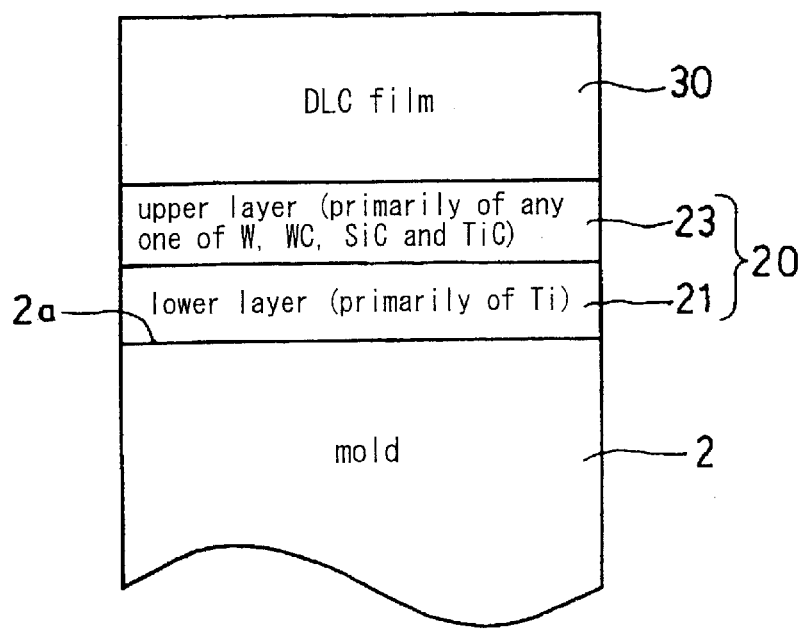
FIG. 5 is a schematic sectional view showing another example of a structure of a double-layered intermediate film, similarly.

FIG. 5 shows another example of an intermediate layer of a double-layer structure. In this example, an intermediate layer 20 composed of a lower layer 21 made primarily of titanium (Ti) and an upper layer 23 made primarily of any one of tungsten (W), tungsten carbide (WC), silicon carbide (SiC), and titanium carbide (TiC) is formed on the mold surface 2a, and a DLC film 30 is formed on the upper layer 23. Even with the above structure, the same adhesion strength of the DLC film 30 as that in the example shown in FIG. 4 can be obtained. The lower layer 21 and the upper layer 23 of the intermediate layer 20 are each formed to a thickness of about 0.5 µm, and the DLC film is formed to a thickness of about 1 µm to 5 µm.

Figure 6:
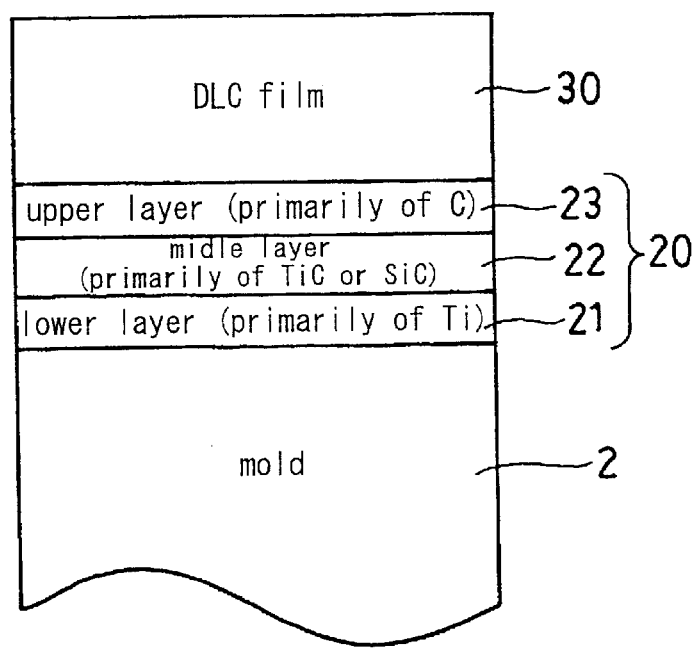
FIG. 6 is a schematic sectional view showing an example of a structure of a triple-layered intermediate film, similarly.

FIG. 6 shows an example in which an intermediate layer of a triple-layer structure is formed. In this example, as an intermediate layer 20, a lower layer 21 made primarily of titanium (Ti) is first formed, a middle layer 22 made primarily of titanium carbide (TiC) or silicon carbide (SiC) is formed on the lower layer 21, and further an upper layer 23 made primarily of carbon (C) is formed on the middle layer 22. Then, a DLC film 30 is formed on the upper layer 23.

In this case, the lower layer 21, the middle layer 22, and the upper layer 23 are not made in clearly different layers but may be made in a gradient structure in which the concentration of titanium is highest in a portion of the lower layer adjacent to the mold surface 2a and gradually becomes lower toward the upper layer 23, and the concentration of carbon is highest in a portion of the upper layer 23 adjacent to the DLC film 30 and gradually becomes lower toward the lower layer 21. If anything, the employment of such a gradient structure can enhance the adhesion strength of the DLC film 30.

It is preferable that the surface of the DLC film 30 as formed in each example is subject to polishing and lapping into a mirror face finish to have a surface roughness Ra of about 0.2 µm to 0.02 µm.

In the aforesaid resin molding mold in each embodiment, the DLC film is formed on the surface of the moving mold contacting the stamper with the intermediate layer interposed in-between because of the structure in which the stamper is attached to the surface of the moving mold forming the cavity. However, not limited to the above, in the case of a resin molding mold of a structure in which a stamper is attached to the surface of a fixed mold forming a cavity, it is suitable to form a DLC film on the surface of the fixed mold contacting the stamper with an intermediate layer interposed in-between.

Evaluation of Resistance-to-Wear by Abrasion Test

Abrasion tests were conducted on test pieces provided with the same coating structure as that for the mold according to the invention, and a testpiece provided with same coating structure as that for a conventional mold, respectively, and resistance-to-wear was evaluated by comparing results of the abrasion tests.

The apparatus used in the abrasion tests was the abrasion tester manufactured by Suga Testing Instrument Co., Ltd., under the trade name of NUS-ISO-2.

Figure 7:
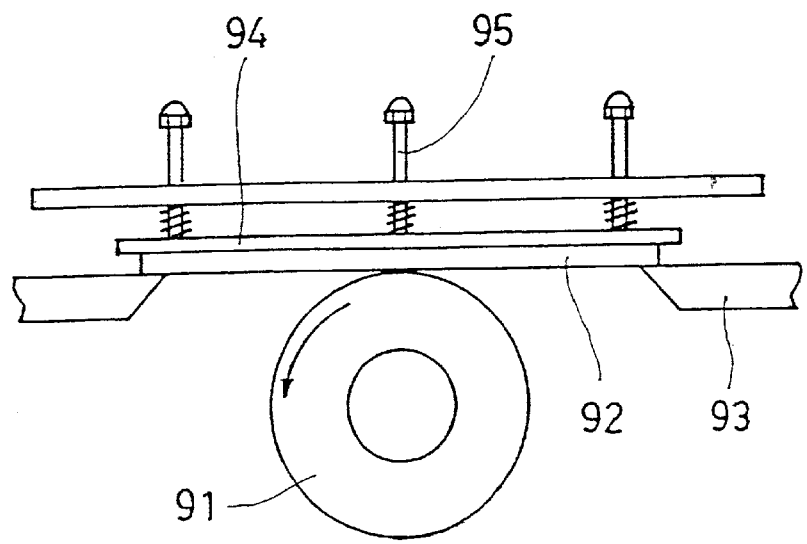
FIG. 7 is a view for illustrating a method of testing resistance-to-wear of a film by use of an abrasion test apparatus.

Referring to FIG. 7, a method of performing an abrasion test by use of the abrasion tester is described hereafter.

As shown in FIG. 7, a testpiece 92 which is coated with a film with its coated surface facing downward is fixedly attached to an opening of a testpiece mount 93 by a testpiece holder plate 94 and a setscrew 95. Then, an abrasive wheel 91 is pasted with an abrasive paper (not shown). An upward load is applied to the abrasive wheel 91 such that the abrasive paper is pressed to the testpiece 92 by a balance mechanism not shown.

Subsequently, the testpiece mount 93 is caused to make reciprocal motion by means of a mechanism (not shown) for converting the rotary motion of a motor into reciprocal motion, and every time the testpiece mount 93 makes one reciprocal motion, the abrasive wheel 91 is caused to rotate in the direction of the arrow by an angle of 0.9 degrees.

As a result of such movements, the testpiece 92 is always kept in contact with a fresh region (not worn away yet) of the abrasive paper pasted on the abrasive wheel 91. The number of reciprocal motions made by the testpiece mount 93 can be set automatically, and when the set number is reached, the abrasion tester stops operation automatically.

The testpiece 92 for the abrasion test employs a substrate made of steel, 1 mm in thickness for fabricating the resin molding mold, having a surface polished to surface roughness of Ra=0.05 µm to 0.5 µm.

As a testpiece equivalent to the mold of the invention, a testpiece (referred to as testpiece 92A) provided with a lower intermediate layer made of titanium, and an upper intermediate layer made of silicon, both formed to a thickness of 0.5 µm, and a DLC film with a thickness of 1.0 µm formed at the top was employed. As a testpiece equivalent to that of the conventional mold, used for comparative purposes, a testpiece (referred to as testpiece 92B) provided with a DLC film formed directly on the same substrate as that of the testpiece 92A described above to a thickness of 1.0 µm was employed.

Silicon carbide of mesh No. 600 was used for the abrasive paper pasted on the abrasive wheel 91, and the abrasion tests were conducted on the coating formed on the testpiece 92A and the same on the testpiece 92B, respectively, under conditions of contact load between the abrasive paper and the testpiece 92 at 830 g and the number of reciprocal motions of the testpiece mount 93 at 200.

Results of the abrasion tests showed that with the testpiece 92A having the coating structure according to the invention, exfoliation of the coating hardly occurred, and the surface condition of the DLC film did not change after testing. On the other hand, with the testpiece 92B having the conventional coating structure, exfoliation of the DLC film occurred to such a degree that steel of the surface of the testpiece could be visually observed, with obvious recognition of the exfoliation of the DLC film.

The difference in the coating structure between the testpiece 92A and the testpiece 92B is that the former has the DLC film formed on the surface of the substrate thereof with the double-layer intermediate layer interposed in-between while the latter has the DLC film formed directly on the surface of the substrate thereof. The results of the abrasion tests demonstrate that by providing the double-layer intermediate layer, the adhesion strength of the DLC film is increased, and the resistance-to-wear of the coating is substantially enhanced.

Testpieces in which a single-layer intermediate layer made of any of silicon, tungsten, titanium carbide, silicon carbide, and chromium carbide is formed on the surface of each of the substrates to a thickness of about 0.5 µm and a DLC film with a thickness of about 1.0 µm is formed thereon, are made and subjected to the abrasion tests under the same conditions as the aforesaid. The surface condition of the DLC film of any of them hardly changed with 200 reciprocal motions as in the case of the testpiece A. Consequently, it is demonstrated that by providing a single-layer intermediate layer, the DLC film also increases in adhesion strength and the coating substantially improves in resistance-to-wear, having no problem for use.

Evaluation of Surface Property by Scratch Test

Next, scratch tests were conducted on various testpieces equivalent to the mold according to the invention and a conventional mold, respectively, and the mechanical properties (particularly, resistance-to-wear) of the coatings were evaluated. The instrument used in the scratch tests was a surface property measuring instrument of the HEIDON-14 type.

The surface property of a coating can be evaluated by measuring the resistance occurring when a testpiece is scratched in a scratch test using the surface property measuring instrument.

Six different testpieces described hereafter, denoted by (A) through (F), were prepared, and resistance occurring with these testpieces when they were scratched were measured by the surface property measuring instrument described above. Substrates of all the testpieces were made of steel used for the resin molding mold, and the surfaces thereof were polished:

(A) a testpiece with a DLC film formed directly on the surface of a substrate;

(B) a testpiece with a DLC film formed on the surface of a substrate with an intermediate layer made of titanium carbide (TiC) interposed in-between;

(C) a testpiece with a DLC film formed on the surface of a substrate with an intermediate layer made of silicon carbide (SiC) interposed in-between;

(D) a testpiece with a DLC film formed on the surface of a substrate with a lower intermediate layer made of titanium (Ti) and an upper intermediate layer made of silicon (Si) interposed in-between;

(E) a testpiece with a DLC film formed on the surface of a substrate with a lower intermediate layer made of titanium (Ti) and an upper intermediate layer made of silicon carbide (SiC) interposed in-between; and (F) a testpiece with a DLC film formed on the surface of a substrate with a lower intermediate layer made of titanium (Ti), a middle intermediate layer made of silicon carbide (SiC), and an upper intermediate layer made primarily of carbon interposed in-between.

The thickness of the DLC film in common on all the testpieces described above was 1.0 $\mu$m, and the thickness of the intermediate layers made of titanium carbide, silicon carbide, titanium, and silicon, respectively, was 0.5 $\mu$m.

Measurement of the surface property of the coatings by use of the surface property measuring instrument was performed at a scratching velocity of 30 mm/minute, and under a scratch load being varied by increments of 10 g in the range of 10 gr to 500 gr, using a diamond indentater having a tip angle of 90 degrees and a radius of curvature of the tip of 50 $\mu$m.

Figure 8:
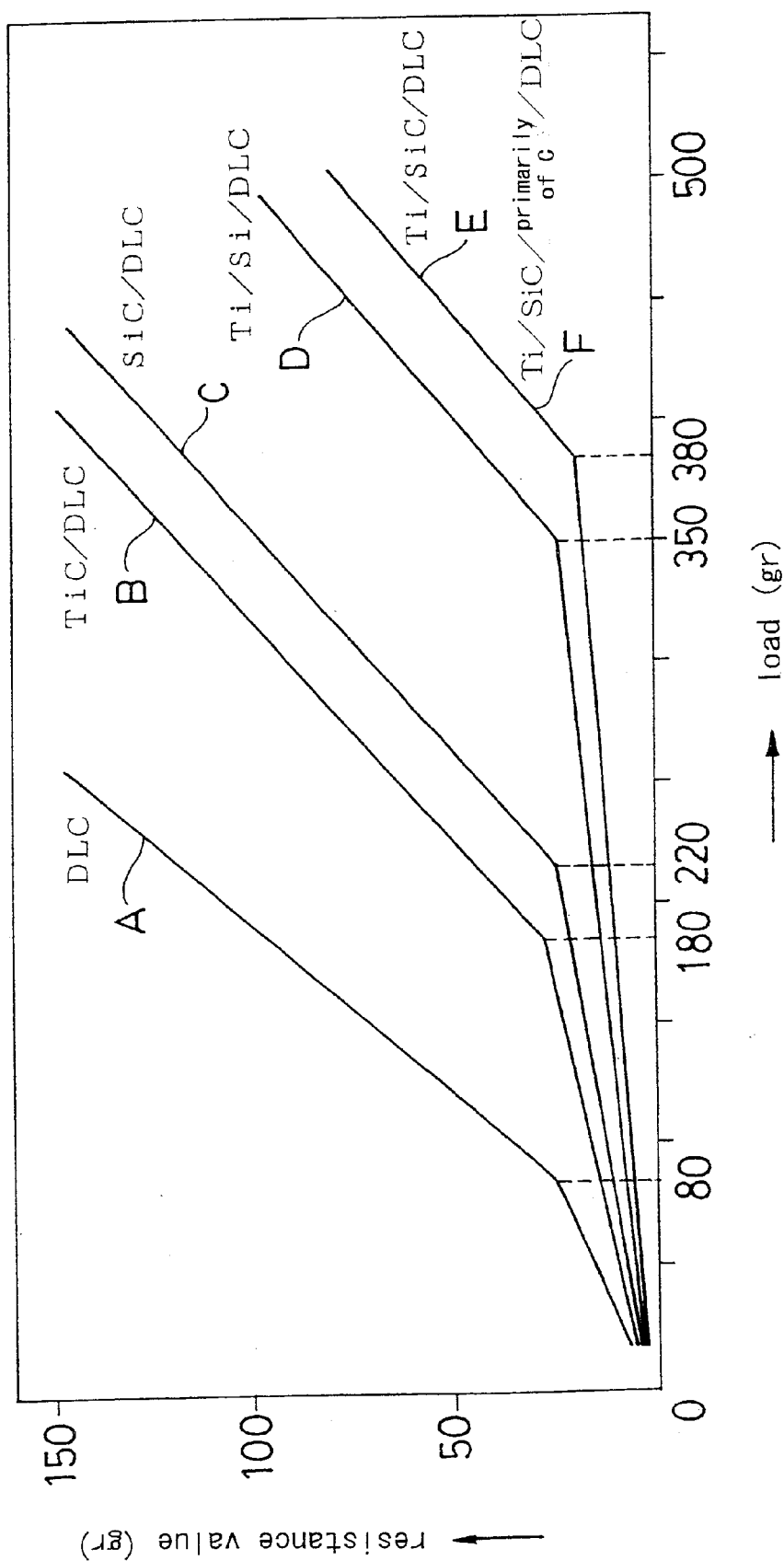
FIG. 8 is a graph showing the correlation between scratch load and scratch resistance as measured at a scratch test conducted on various test pieces equivalent to those for the mold according to this invention and a conventional mold, respectively.

FIG. 8 is a graph showing the correlation between the scratch loads and scratch resistance values, based on the measurement results.

The graph in FIG. 8 is formed by plotting points of the scratch resistance values measured when the scratch load was increased by increments of 10 gr starting from 10 gr, and by joining the mean values thereof to form straight lines by approximation.

In the graph in FIG. 8, the ordinate indicates the scratch resistance value, and the abscissa the scratch load. Lines denoted by A, B, C, D, E and F indicate the measurement results of the testpieces A, B. C, D, E and F, respectively. The lines E and F are nearly the same.

As is obvious from FIG. 8, resistance changes sharply when the scratch load increases to a certain value or above. It is deemed that such a phenomenon that an inflection point appears on a characteristics curve occurs when the scratch load reaches a critical load or above after a linear increase in the scratch resistance along with an increase in the scratch load because cracks are caused to occur to the coating formed on the ceramics substrate by the indentater making a mere frictional sliding motion until the scratch load reaches a scratch load value corresponding to the inflection point. Thereafter, the scratch resistance value indicates a sharp increase due to the cracks that occurred, increasing the friction coefficient.

Thus, from the critical load values corresponding to the inflection points of the characteristic curves in FIG. 8, adhesion strength of the coating on the substrate can be evaluated.

As shown in FIG. 8, the critical load for the testpiece (A) with the hard carbon film formed directly on the substrate, representing the conventional case, is 80 gr.

On the other hand, the critical load for the testpiece (B), of the coating structure having single-layered intermediate layer equivalent to the embodiment of the invention, is 180 gr, the critical load in the case of the testpiece (C) is 220 gr, the critical load in the case of the testpiece (D) having a double-layered intermediate layer is 350 gr, and the critical loads in the case of the testpieces (E) and (F) are 380 gr respectively.

This means that in the case of the mold according to the invention, the DLC film has an adhesion strength more than twice as much as that for the conventional case.

Embodiment of a Method of Forming a Hard Film

Now, description will be made hereafter of a method of forming the hard film on the surface 2a of the moving mold (called only "mold") 2 at least at a part to be contacted with the stamper in the aforesaid resin molding mold according to the invention with reference to FIGS. 9 through 12.

First, an intermediate layer forming step of forming the aforesaid intermediate layer 20 on the surface of the mold will be explained with reference to FIG. 9.

Figure 9:
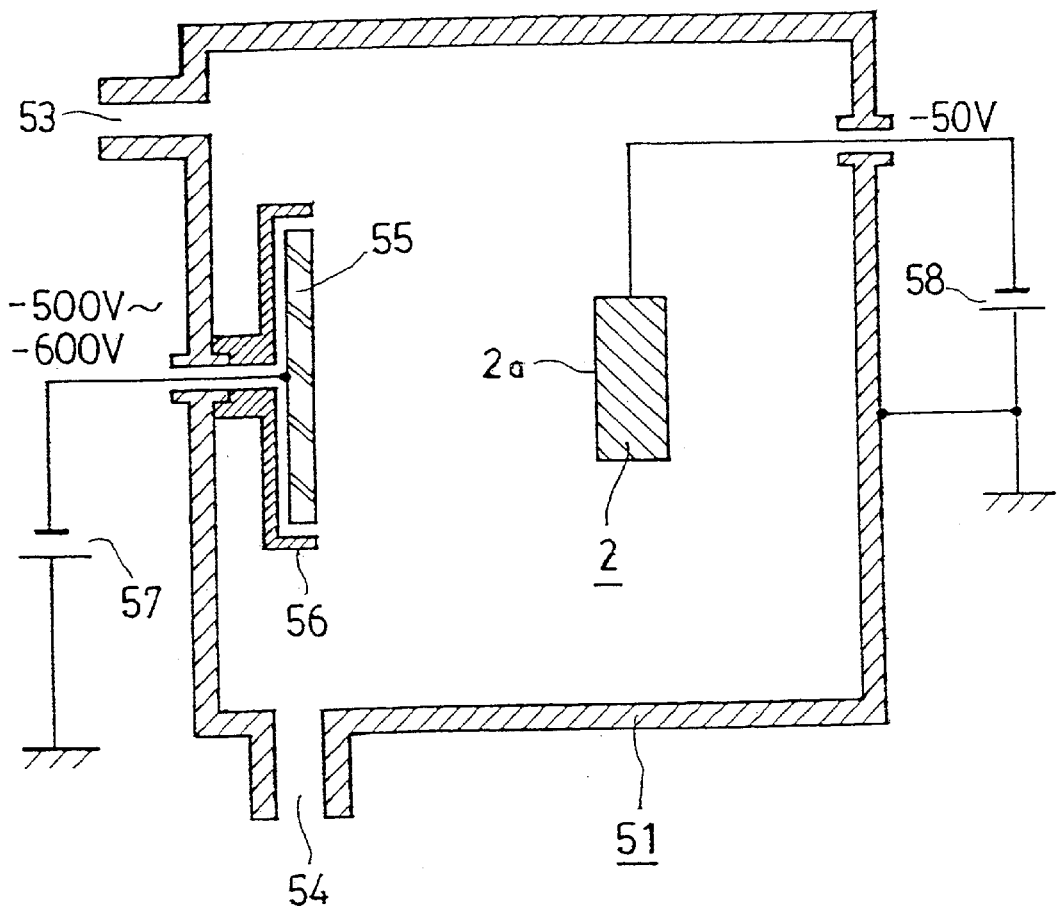
FIG. 9 is a sectional view illustrating a sputtering apparatus used in the steps of forming intermediate layers in a method of forming a hard film on the resin molding mold according to this invention.

FIG. 9 is a sectional view of a sputtering system used to form the intermediate layer.

As shown in the figure, a target holder 56 is fixedly secured in close vicinity of the internal surface of one of the walls of a vacuum chamber 51 provided with a gas inlet 53 and an exhaust outlet 54, and a target 55 which is a material for the intermediate layer is disposed inside the target holder 56.

The mold 2 (illustrated simply), with the surface 2a on which the stamper is mounted having been cleaned, is disposed in the vacuum chamber 51 such that the surface 2a faces the target 55.

The mold 2 is connected to a DC power source 58, and the target 55 to a target power source 57. A shutter (not shown) which can be closed to a position to cover the target 55 and opened to a position to expose the target 55 is provided between the target 55 and the mold 2. The shutter is initially placed at a position covering the target 55.

The vacuum chamber 51 is evacuated to a degree of vacuum of $4 \times 10^{-3}$ pascals ($3 \times 10^{-5}$ torr) or lower through the exhaust outlet 54 by an evacuation means not shown.

Thereafter, argon (Ar) gas as a sputtering gas is fed into the vacuum chamber 51 through the gas inlet 53, and the degree of vacuum therein is adjusted to become $4 \times 10^{-1}$ pascals ($3 \times 10^{-3}$ torr).

Then, a DC voltage at –50V from the DC power source 58 is applied to the mold 2, and a DC voltage in the range of –500V to –600V from the target power source 57 is applied to the target 55.

Thereupon, plasma is generated in the vacuum chamber 51, and ionized argon ion-bombards the surface 2a of the mold 2 to remove an oxide film or the like formed on the surface.

Next, the not shown shutter is opened to expose the target 55 to sputter the surface of the target 55 by argon ions in the plasma. In the case of the target 55 being silicon, silicon molecules thrown out of the surface adhere to the surface 2a of the mold 2, forming the intermediate layer made of a silicon film. The intermediate layer forming step is carried out such that the intermediate layer is formed to a predetermined thickness by this sputtering process.

When a single-layer intermediate layer 20 shown in FIG. 3 is formed, any one of silicon, tungsten, titanium carbide, silicon carbide, and chromium carbide is disposed as a target 55 and subjected to the aforesaid sputtering.

The above sputtering forms the intermediate layer 20 made of any of a silicon film, a tungsten film, a titanium carbide film, a silicon carbide film, and a chromium carbide film on the surface 2a of the mold 2.

When an intermediate layer made of a titanium carbide film or a silicon carbide film is formed, the following method can be employed.

That is, titanium or silicon is disposed as the target 55 and sputtering by argon ions are performed. At the same time, for example, methane gas ($CH_4$) as a carbon-containing gas is fed through the gas inlet 53, and reactive sputtering is performed by sputtered molecules of titanium or silicon and carbon in the gas to thereby form the intermediate layer 20 made of a titanium carbide film or a silicon carbide film on the surface 2a of the mold 2.

When a double-layer intermediate layer 20 composed of a lower layer 21 and an upper layer 23 shown in FIG. 4 is formed, two target holders 56 and shutters facing them respectively are provided in the vacuum chamber 51, and chromium or titanium is disposed as a target 55 at one target holder 56 and silicon or germanium is disposed as a target 55 at the other target holder 56.

First, in a first intermediate layer forming step, only the shutter on the target holder 56 side where chromium or titanium is disposed as the target 55 is opened and sputtering is performed to form the lower layer 21 of a film made primarily of chromium or titanium on the surface 2a of the mold 2 to a film thickness of about 0.5 $\mu$m.

Sequentially, in a second intermediate layer forming step, only the shutter on the target holder 56 side where silicon or germanium is disposed as the target 55 is opened and sputtering is performed to form the upper layer 23 of a film made primarily of silicon or germanium on the lower layer 21 to a film thickness of about 0.5 $\mu$m.

When a double-layer intermediate layer 20 composed of a lower layer 21 and an upper layer 23 shown in FIG. 5 is formed, in the same manner as the above, two target holders 56 and shutters facing them respectively are provided in the vacuum chamber 51, and titanium is disposed as a target 55 at one target holder 56 and any one of tungsten, tungsten carbide, silicon carbide, and titanium carbide is disposed as a target 55 at the other target holder 56.

First, in a first intermediate layer forming step, only the shutter on the target holder 56 side where titanium is disposed as the target 55 is opened and sputtering is performed to form the lower layer 21 of a film made primarily of titanium on the surface 2a of the mold 2 to a film thickness of about 0.5 $\mu$m.

Sequentially, in a second intermediate layer forming step, only the shutter on the target holder 56 side where any one of tungsten, tungsten carbide, silicon carbide, and titanium carbide is disposed as the target 55 is opened and sputtering is performed to form the upper layer 23 of a film made primarily of any one of tungsten, tungsten carbide, silicon carbide, and titanium carbide on the lower layer 21 to a film thickness of about 0.5 $\mu$m.

Alternatively, it is possible that after the lower layer 21 of the intermediate layer made primarily of titanium is formed on the surface 2a of the mold 2 in the first intermediate layer forming step, only the shutter on the target holder 56 side where tungsten or silicon is disposed as the target 55 is opened, and a carbon-containing gas, for example, methane gas ($CH_4$) is simultaneously fed into the vacuum chamber 51 to form the upper layer 23 of the intermediate layer made primarily of tungsten carbide or silicon carbide on the lower layer 21 by reactive sputtering by sputtered tungsten or silicon molecules and carbon in the gas in the second intermediate layer forming step.

Further, also in the case where a triple-layered intermediate layer 20 composed of a lower layer 21, a middle layer 22, and an upper layer 23 shown in FIG. 6 is formed, when the middle layer 22 is made into a film made primarily of silicon carbide, two target holders 56 and shutters facing them respectively are provided in the vacuum chamber 51, and titanium is disposed as a target 55 at one target holder 56 and silicon is disposed as a target 55 at the other target holder 56.

First, in a first intermediate layer forming step, only the shutter on the target holder side where titanium is disposed as a target 55 is opened and sputtering is performed to form the lower layer 21 of a film made primarily of titanium on the surface 2a of the mold 2.

Sequentially, in a second intermediate layer forming step, only the shutter on the target holder side where silicon is disposed as a target 55 is opened and a carbon-containing gas, for example, methane gas ($CH_4$) is fed into the vacuum chamber 51 to form the middle layer 22 of a film made primarily of silicon on the lower layer 21 by reactive sputtering by sputtered silicon molecules and carbon in the gas.

Thereafter, in a third intermediate layer forming step, a shutter (not shown) in the vacuum chamber 51 is gradually closed to reduce the exposure amount of silicon as a target 55, gradually decreasing the amount of sputtering of silicon, thereby forming the upper layer 23 made primarily of carbon, in which the ratio of carbon gradually increases, on the middle layer 22.

It should be noted that when the middle layer 22 is made into a film made primarily of titanium carbide, it is sufficient to provide one pair of the target holder 56 and the shutter in the vacuum chamber 51, and titanium is disposed at the target holder 56 and then the same steps as the aforesaid first, second, and third intermediate forming steps may be carried out. However, it is unnecessary to switch closing and opening of the two shutters between the first intermediate layer forming step and the second intermediate layer forming step.

Figure 10:
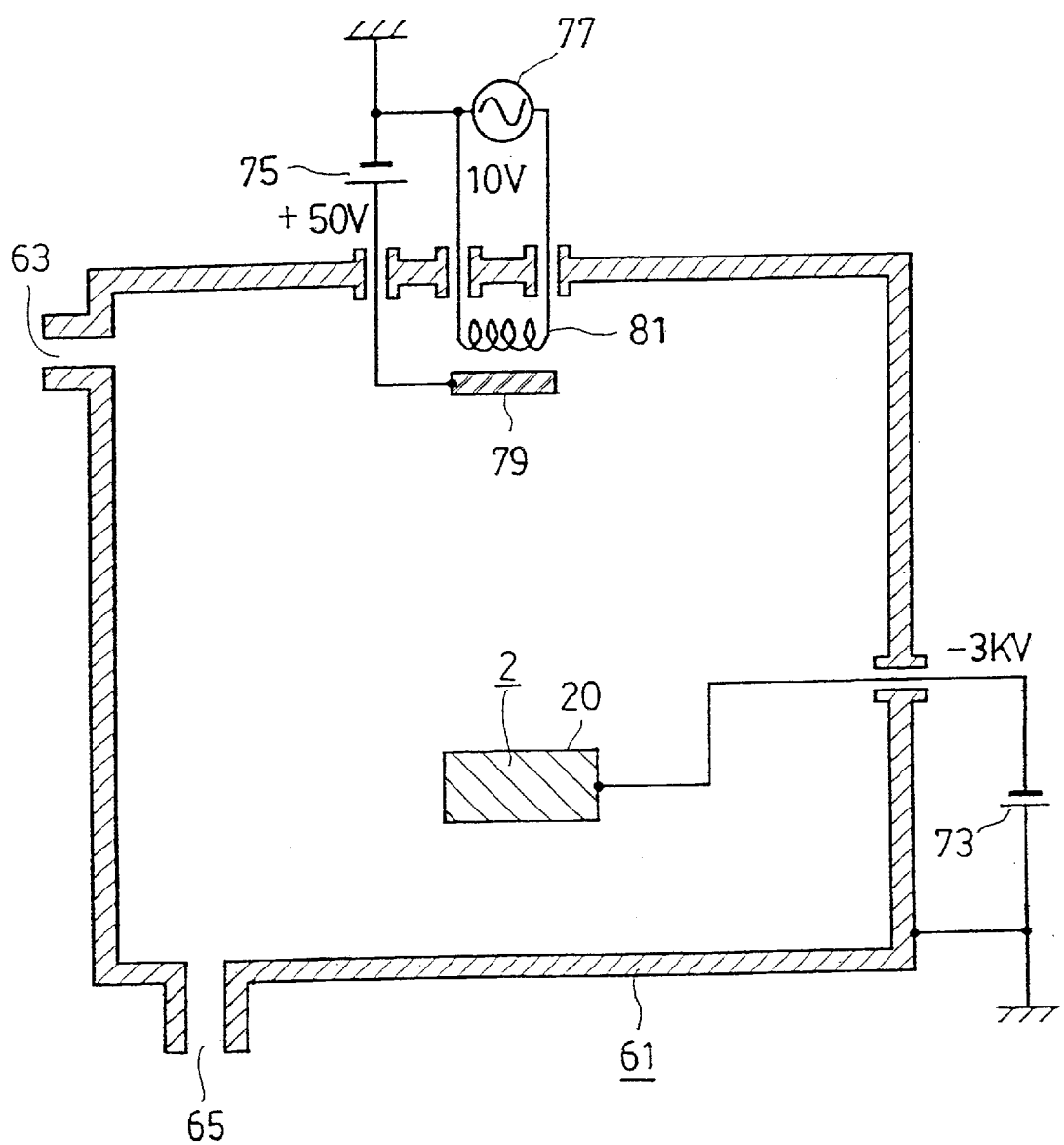
FIG. 10 is a sectional view showing an example of a plasma CVD apparatus used in the step of forming an DLC film in the method of forming a hard film on the resin molding mold according to this invention.
Figure 11:
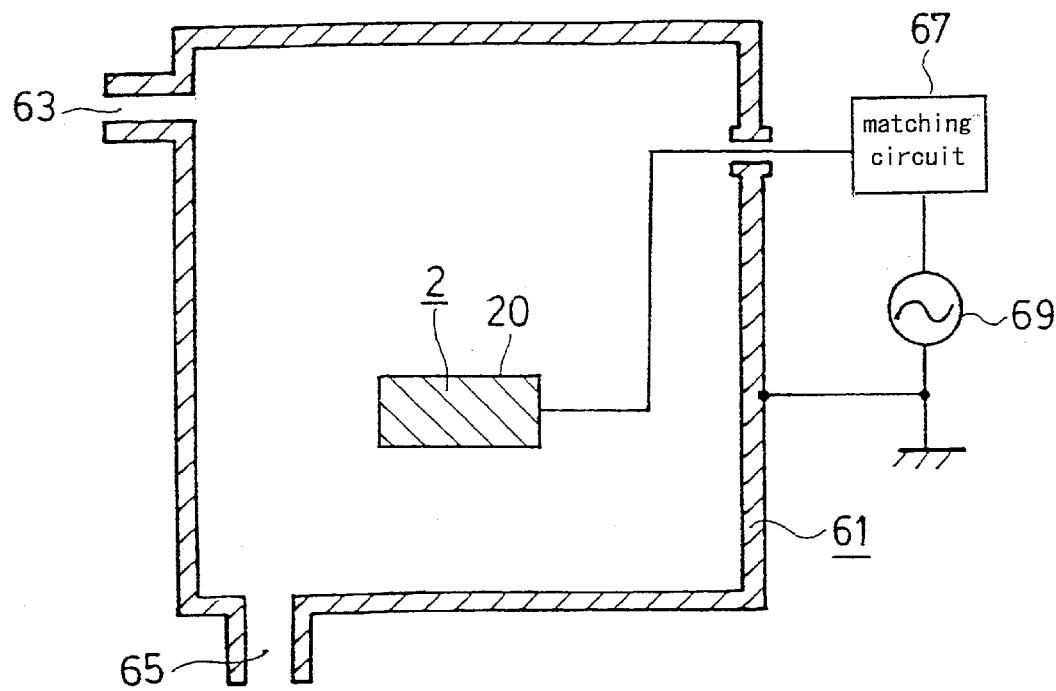
FIG. 11 is a sectional view showing another example of the plasma CVD apparatus, similarly.
Figure 12:
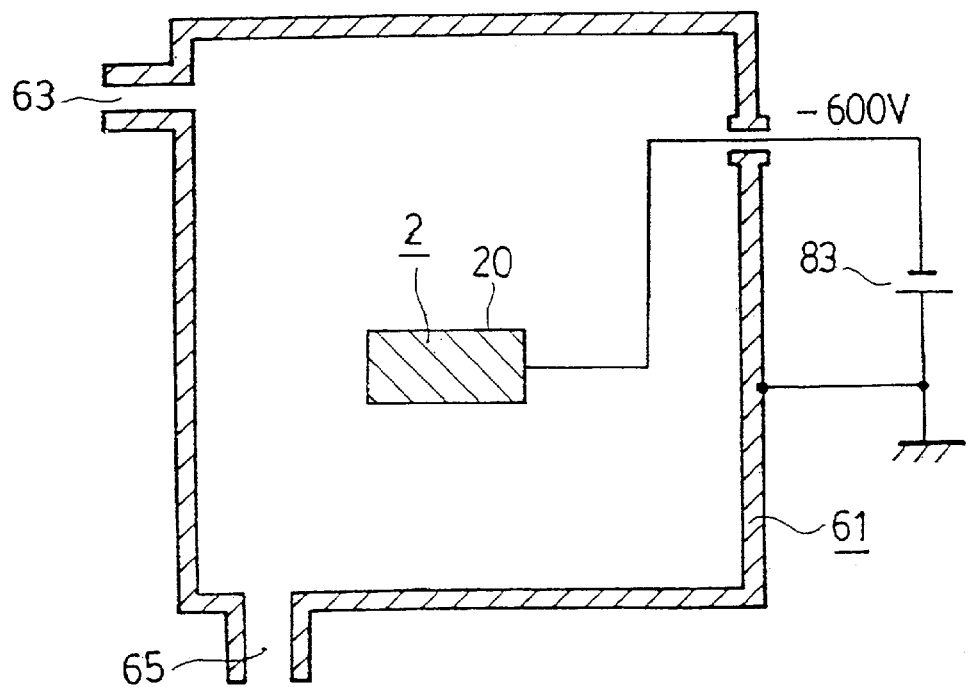
FIG. 12 is a sectional view showing still another example of the plasma CVD apparatus, similarly.

Referring to FIGS. 10 to 12, steps of forming the DLC film 30 on the intermediate layer 20 of the mold 2 on which the intermediate layer 20 is formed on at least the surface 2a which is contacted with the stamper by various kinds of intermediate layer forming steps as described above, are described hereafter. That is, as the DLC film forming steps, there are three ways of forming the DLC film.

Referring to FIG. 10, a first DLC film forming method for the DLC film is first described. FIG. 10 is a sectional view of a plasma CVD apparatus used for such a purpose.

The first DLC film forming method uses a vacuum chamber 61 having a gas inlet 63 and an exhaust outlet 65 and provided with an anode 79 and a filament 81 at the top of the inside thereof. The mold 2 with the intermediate layer 20 formed on at least the surface 2a which is contacted with the stamper is disposed inside the vacuum chamber 61. A member for supporting the mold 2 is not shown.

The vacuum chamber 61 is evacuated to a degree of vacuum of $4 \times 10^{-3}$ pascals ($3 \times 10^{-5}$ torr) or lower through the exhaust outlet 65 by an evacuation means not shown.

Thereafter, benzene ($C_6H_6$) as a carbon-containing gas is fed into the vacuum chamber 61 through the gas inlet 63, and the pressure therein is adjusted to become $6.67 \times 10^{-1}$ pascals ($5-10^{-3}$ torr).

Then, a DC voltage from a DC power source 73 is applied to the mold 2, a DC voltage from an anode power source 75 is applied to the anode 79, and an AC voltage from a filament power source 77 is applied to the filament 81.

Hereupon, the DC voltage from the DC power source 73 applied to the mold 2 is set at −3 kV, the DC voltage from the anode power source 75 applied to the anode 79 is set at +50 V, and the voltage from the filament power source 77 applied to the filament 81 is set at 10 V to allow a flow of electric current at 30 A.

Plasma is then generated in the peripheral region of the mold 2 disposed inside the vacuum chamber 61, and through the plasma CVD process, the diamond-like carbon (DLC) film can be formed on the surface of the intermediate layer 20 (on the upper layer 23 in the case of a multi-layered intermediate layer) on the mold 2. The DLC film 5 is formed to a film thickness in the range of 1 μm to 5 μm.

For convenience of description, the vacuum chamber 51 used in the intermediate layer forming steps and the vacuum chamber 61 used in the DLC film forming step are individually explained, but those steps can be sequentially performed using the same vacuum chamber. In this case, after the completion of the intermediate layer forming steps, argon in the vacuum chamber is exhausted and a carbon-containing gas is fed thereto.

FIG. 11 is a sectional view of a plasma CVD apparatus for describing another example of the DLC film forming method.

In the case of employing the system shown in FIG. 11, the mold 2 with the intermediate layer 20 formed thereon is disposed inside a vacuum chamber 61 having a gas inlet 63 and an exhaust outlet 65. The vacuum chamber 61 is evacuated to a degree of vacuum of $4 \times 10^{-3}$ pascals ($3 \times 10^{-5}$ torr) or lower through the exhaust outlet 65 by an evacuation means not shown.

Thereafter, methane gas ($CH_4$) as a carbon-containing gas is fed into the vacuum chamber 61 through the gas inlet 63, and the vacuum degree therein is adjusted to become 0.1 torr.

Then, radio frequency power from a radio frequency power source 69 at an oscillation frequency of 13.56 MHz is applied to the mold 2 via a matching circuit 67. Hereupon, plasma is generated in the peripheral region of the mold 2, and through the plasma CVD process, the DLC film can be formed on the surface of the intermediate layer 20 (the upper layer 23 in the case of a multi-layered intermediate layer) formed on the mold 2.

FIG. 12 is a sectional view of a plasma CVD apparatus for describing still another example of a DLC film forming method.

In the case of employing the system shown in FIG. 12, the mold 2 with the intermediate layer 20 formed thereon is disposed inside a vacuum chamber 61 having a gas inlet 63 and an exhaust outlet 65. The vacuum chamber 61 is evacuated to a degree of vacuum of $4 \times 10^{-3}$ pascals ($3 \times 10^{-5}$ torr) or lower through the exhaust outlet 65 by an evacuation means not shown.

Thereafter, methane ($CH_4$) gas as a carbon-containing gas is fed into the vacuum chamber 61 through the gas inlet 63, and the vacuum degree therein is adjusted to become 13.33 pascals (0.1 torr).

Then, a DC voltage at −600 V from a DC power source 83 is applied to the mold 2, causing generation of plasma in the peripheral region thereof. Subsequently, by use of the plasma CVD process, the DLC film can be formed on surface of the intermediate layer 20 (the upper layer 23 in the case of a multi-layered intermediate layer) formed on the mold 2.

These DLC film forming methods can also be performed following the intermediate film forming steps, using the same vacuum chamber as that in the intermediate film forming steps. In this case, after the completion of the intermediate layer forming steps, argon in the vacuum chamber is exhausted and a carbon-containing gas is fed thereto.

In forming the DLC film according to the methods described with reference to FIGS. 10 to 12, the examples are cited wherein methane gas or benzene gas is used as a carbon-containing gas. However, a carbon-containing gas such as ethylene other than methane, or a vapor of a carbon-containing liquid such as hexane may also be used.

Next, in order to smooth further the surface of the DLC film 30 formed on the surface 2a of the mold 2 with the intermediate layer 20 interposed in-between, the surface of the DLC film 30 is subjected to a step of finish grinding by polishing and lapping so that a surface roughness Ra thereof becomes about 0.2 μm to 0.02 μm.

In this case, the polishing is performed with a diamond paste or an alumina paste put on a piece of cloth, and the lapping is performed with a diamond paste or a alumina paste put on a disc-shaped plate. The particle diameter of diamond or alumina in the diamond paste or the alumina paste at that time ranges from about 0.1 μm to 4 μm, and it is preferable to use a paste with 1 μm or larger for the polishing and a paste with 1 μm or smaller for the lapping.

Even with such a grinding step, the DLC film never peels off because it is securely formed on the surface of the mold with the intermediate layer interposed in-between.

Thickness of Each Film Formed by the Invention (1) In the case where the DLC film is formed on the surface of the mold with the double-layered intermediate layer composed of the lower layer made primarily of titanium (Ti) or chromium (Cr) and the upper layer made primarily of silicon (Si) or germanium (Ge) interposed in-between by the invention, effective film thickness range of each film is as follows.

|  | Ti or Cr film | Si or Ge film | DLC film |
| --- | --- | --- | --- |
| Effective film thickness range: | 0.005 to 1.0 μm | 0.005 to 1.0 μm | 0.3 to 10 μm |
| Preferable range: | 0.05 to 0.8 μm | 0.05 to 0.8 μm | 0.5 to 5 μm |
| Most preferable range: | 0.1 to 0.6 μm | 0.1 to 0.6 μm | 0.8 to 3 μm |

(2) In the case where the DLC film is formed on the surface of the mold with the single-layered intermediate layer made of any one of silicon Si), tungsten (W), titanium carbide (TiC), silicon carbide (SiC), and chromium carbide (CrC) interposed in-between by the invention, effective film thickness range of each film is as follows.

|  | Intermediate layer | DLC film |
| --- | --- | --- |
| Effective film thickness range: | 0.005 to 2 μm | 0.3 to 10 μm |
| Preferable range: | 0.05 to 1.5 μm | 0.5 to 5 μm |
| Most preferable range: | 0.1 to 1.2 μm | 0.8 to 3 μm |

INDUSTRIAL APPLICABILITY

As has been described, according to this invention, a DLC film that is a hard film is formed on a surface of a mold forming a cavity for a mold for molding a resin at least at a part to be contacted with a stamper with strong adhesion not to easily peel off, thereby drastically increasing useful life of the mold for molding a resin and also increasing useful life of the stamper without causing damage thereto.

What is claimed is:

1. A mold for molding a resin composed of a fixed mold and a moving mold and used with a stamper being attached to a surface of the mold forming a cavity when both molds are closed, wherein a diamond-like carbon film is formed on the surface of said mold at least at a part to be contacted with the stamper with an intermediate layer for enhancing adhesion strength to the surface of said mold interposed in-between, the intermediate layer has a single-layer structure made of any one of silicon, tungsten, titanium carbide, silicon carbide, and chromium carbide;

a thickness range of the intermediate layer is 0.005 to 2 μm, and a thickness range of the diamond-like carbon film is 0.3 to 10 μm.

2. A mold for molding a resin composed of a fixed mold and a moving mold and used with a stamper being attached to a surface of the mold forming a cavity when both molds are closed, wherein a diamond-like carbon film is formed on the surface of said mold at least at a part to be contacted with the stamper with an intermediate layer for enhancing adhesion strength to the surface of said mold interposed in-between, the intermediate layer has a double-layer structure composed of a lower layer made primarily of chromium or titanium and an upper layer made primarily of silicon or germanium;

each thickness range of the lower and the upper intermediate layer is 0.005 to 1.0 μm, and a thickness range of the diamond-like carbon film is 0.3 to 10 μm.

3. A mold for molding a resin composed of a fixed mold and a moving mold and used with a stamper being attached to a surface of the mold forming a cavity when both molds are closed, wherein a diamond-like carbon film is formed on the surface of said mold at least at a part to be contacted with the stamper with an intermediate layer for enhancing adhesion strength to the surface of said mold interposed in-between, the intermediate layer has a double-layer structure composed of a lower layer made primarily of titanium and an upper layer made primarily of any one of tungsten, tungsten carbide, silicon carbide, and titanium carbide, each thickness range of the lower and the upper intermediate layer is about 0.5 μm, and a thickness range of the diamond-like carbon film is 1 to 5 μm.

4. A mold for molding a resin composed of a fixed mold and a moving mold and used with a stamper being attached to a surface of the mold forming a cavity when both molds are closed, wherein a diamond-like carbon film is formed on the surface of said mold at least at a part to be contacted with the stamper with an intermediate layer for enhancing adhesion strength to the surface of said mold interposed in-between, the intermediate layer has a triple-layer structure composed of a lower layer made primarily of titanium, a middle layer made primarily of titanium carbide or silicon carbide, and an upper layer made primarily of carbon.

5. A mold for molding a resin composed of a fixed mold and a moving mold and used with a stamper being attached to a surface of the mold forming a cavity when both molds are closed, wherein a diamond-like carbon film is formed on the surface of said mold at least at a part to be contacted with the stamper with an intermediate layer for enhancing adhesion strength to the surface of said mold interposed in-between, and the diamond-like carbon film has a surface roughness Ra of 0.2 μm to 0.02 μm.

* * * * *